United States Patent
Coat

(10) Patent No.: US 11,228,419 B2
(45) Date of Patent: Jan. 18, 2022

(54) SYSTEM AND METHOD FOR DATE-STAMPING AN EVENT DETECTED IN AN AUTOMOTIVE VEHICLE

(71) Applicant: RENAULT s.a.s., Boulogne-Billancourt (FR)

(72) Inventor: Denis Coat, Les Alluets le Roi (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 16/764,252

(22) PCT Filed: Nov. 14, 2018

(86) PCT No.: PCT/EP2018/081178
§ 371 (c)(1),
(2) Date: May 14, 2020

(87) PCT Pub. No.: WO2019/096816
PCT Pub. Date: May 23, 2019

(65) Prior Publication Data
US 2020/0403770 A1  Dec. 24, 2020

(30) Foreign Application Priority Data

Nov. 17, 2017  (FR) .................................. 17 60872

(51) Int. Cl.
*H04L 7/08* (2006.01)
*H04L 12/40* (2006.01)

(52) U.S. Cl.
CPC ............. *H04L 7/08* (2013.01); *H04L 12/40* (2013.01); *H04L 2012/40273* (2013.01)

(58) Field of Classification Search
CPC .. H04L 7/08; H04L 12/40; H04L 2012/40273
See application file for complete search history.

(56) References Cited

U.S. PATENT DOCUMENTS 8,645,020 B2 * 2/2014 Tomar .................. G07C 5/00
                                                   701/30.5
8,775,681 B2   7/2014 Menon et al.
(Continued)

FOREIGN PATENT DOCUMENTS

WO   WO 2005/107174 A1   11/2005

OTHER PUBLICATIONS

International Search Report dated Feb. 1, 2019 in PCT/EP2018/081178 filed on Nov. 14, 2018, citing documents AA-AD and AO therein, 3 pages.
(Continued)

*Primary Examiner* — Chandrahas B Patel
(74) *Attorney, Agent, or Firm* — Oblon, McClelland, Maier & Neustadt, L.L.P.

(57) ABSTRACT

A method is for date-stamping an event detected in an automotive vehicle including a plurality of sensors each comprising a relative internal clock and an electronic control unit including an absolute internal clock. The method includes, at each period, resetting the whole set of relative internal clocks of the sensors to zero, storing the absolute time of resetting to zero of the absolute clock at each reset to zero, detecting an event, receiving, at each detected event, a sensor relative time originating from the sensor's relative clock associated with the detected event, and calculating a sensor absolute time as a function of the sensor relative time of the internal clock of a sensor associated with the detected event and of the time of resetting to zero stored by a storage module in the electronic control unit at each reset to zero, defining a reference relative time.

11 Claims, 3 Drawing Sheets

(56) References Cited

U.S. PATENT DOCUMENTS

| | | |
|---|---|---|
| 9,756,590 B2 | 9/2017 | Koenigseder et al. |
| 10,759,470 B2 * | 9/2020 | Kuramitsu ............. B62D 5/049 |
| 11,001,261 B2 * | 5/2021 | Oberg ................. B60W 30/192 |
| 2007/0094528 A1 | 4/2007 | Fredriksson et al. |
| 2008/0034239 A1 | 2/2008 | Lambert et al. |
| 2012/0109453 A1 | 5/2012 | Fredriksson et al. |

OTHER PUBLICATIONS

Preliminary French Search Report dated Aug. 24, 2018 in French Application No. 1760872 filed on Nov. 17, 2017.

* cited by examiner

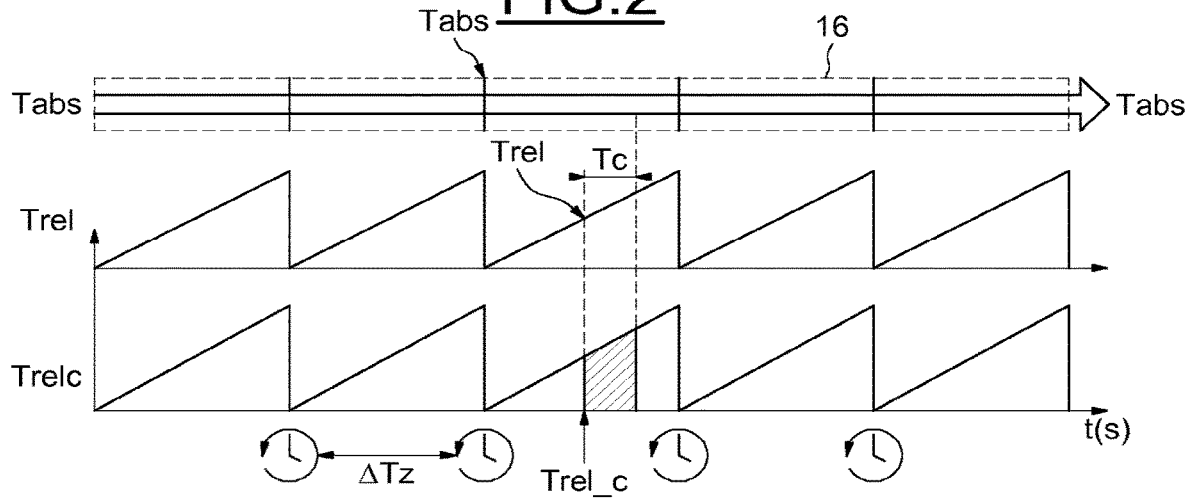
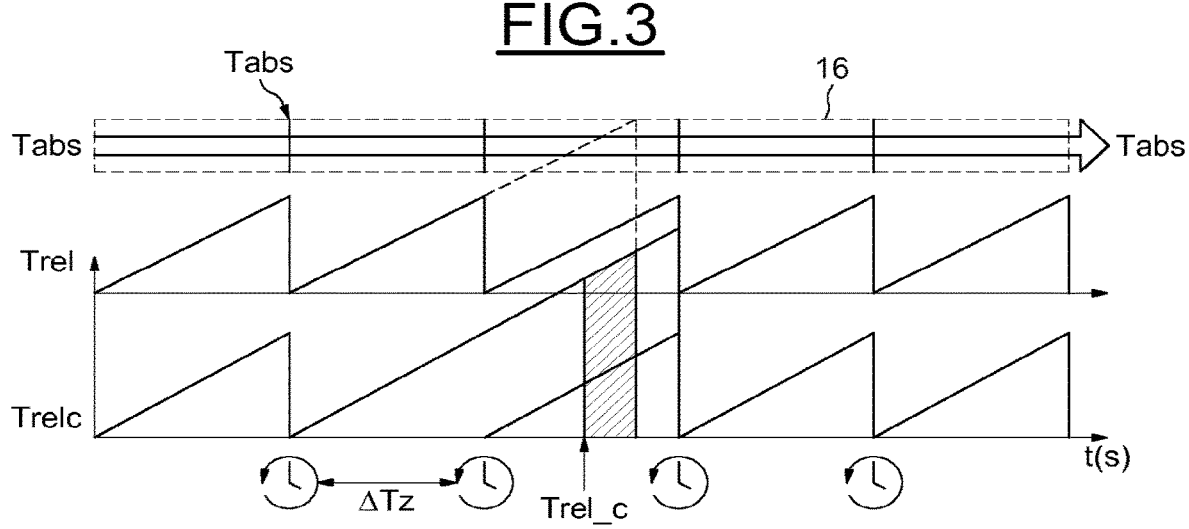
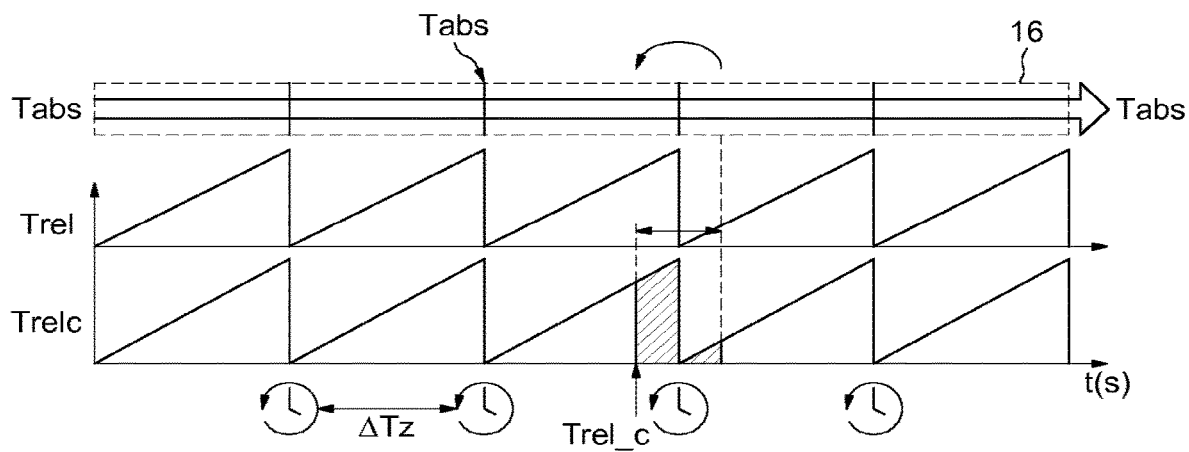

SYSTEM AND METHOD FOR DATE-STAMPING AN EVENT DETECTED IN AN AUTOMOTIVE VEHICLE

The present invention relates to the field of date-stamping an event, notably in control systems of automotive vehicles.

At the present time, the number of sensors on board automotive vehicles is increasing, owing to the need for the data required for driver assistance systems which are becoming increasingly numerous. The information originating from the different sensors must be retrieved in real time, to ensure the consistency of the information supplied. The precise date-stamping of events is therefore particularly important.

Combining several pieces of information from different unsynchronized sensors may result in errors concerning the nature of an event. Thus even a very minor error in the time assigned to a given event may lead to confusion which is harmful to the performance of on-board systems in automotive vehicles, notably driver assistance systems, especially in self-driving vehicles.

The document WO2005/107174-A1 proposes a system configured to bring the time in different timebases used by interconnected units into correlation, in order to date a reference event relative to a first timebase. However, although the system is intended to control the time differences of the various peripherals connected, it does not propose any synchronization between the peripherals. Moreover, such a system is dependent on the use of a plurality of timebases.

The document DE 10 2015 212218-A1 describes a multisensor system comprising a plurality of detection units, each controlled by its internal clock. The system comprises a calculation unit configured to control and synchronize the different sensors using a synchronization signal on the network, which overloads the communication network.

The object of the invention is therefore to overcome these drawbacks and propose a system and a method for the precise and reliable date-stamping of events in an automotive vehicle, with the aim of combining the information originating from different sensors, and avoiding, as far as possible, errors concerning the nature of an event.

The invention proposes a system for date-stamping an event occurring, notably, in an automotive vehicle, comprising a plurality of sensors each comprising a relative internal clock, and an electronic control unit comprising an absolute internal clock independent of the relative internal clocks and configured for communicating with each of the sensors via a communication network.

The relative time measured by the relative internal clock of the sensor of a given event is called the sensor relative time, and the time measured by a reference clock associated with the sensor of a given event is called the reference relative time. The electronic control unit may be, for example, a driving assistance computer, known to those skilled in the art by the English abbreviation "ADAS". The communication network may be, for example, a network which is well known to those skilled in the art by the English abbreviation "CAN", for "Controller Area Network". By way of variant, any communications network, of the Ethernet, FlexRay, or other type, for example, could be provided.

The absolute internal clock of the electronic control unit is considered to be the absolute reference clock. The absolute reference clock time is called the absolute time. The reference clock associated with the sensor, preferably hosted by the electronic control unit, is synchronized with the absolute internal clock.

"Event" is taken to mean any signal detected by a sensor such as a camera, a radar apparatus, or any other means capable of detecting an object or a target.

The electronic control unit data comprises a processing module configured for receiving at its input, at each event detected by the sensor, a relative time originating from the relative clock of the sensor associated with the detected event; a zero resetting module configured for transmitting, at each period, a signal for resetting to zero all the relative internal clocks, via communication frames of the communication network; and a calculation module configured for calculating a sensor absolute time as a function of the sensor relative time received by the processing module and a zero reset time stored by a storage module in the electronic control unit at each zero reset, enabling a reference relative time to be defined.

Thus the zero resetting of all the relative clocks, using periodic communication frames already present in the communication network, makes it possible to avoid any additional network load and to reduce losses of time caused by the preparation of an absolute synchronization frame which subsequently has to be decoded, as is the case in the prior art.

According to the present invention, the reception of a zero reset signal by communication frames simply reinitializes the local counter of each of the relative clocks.

Advantageously, the sensor absolute time calculation module comprises a module configured for comparing the relative time of the internal clock of a sensor associated with the detected event with the reference relative time of the internal clock of the electronic control unit.

For example, when the sensor relative time is less than the reference relative time, the calculation module is configured for calculating the sensor absolute time by adding the sensor relative time to the zero reset time stored by the storage module, minus a predetermined processing time.

According to another example, when the sensor relative time is greater than the reference relative time, the calculation module comprises a comparison module configured for comparing said sensor relative time with the zero reset period, and when the sensor relative time is greater than the zero reset period, the calculation module is configured for calculating the sensor absolute time by adding the sensor relative time modulo the zero reset period to the zero reset time.

When the sensor relative time is less than the zero reset period, the calculation module is configured for calculating the sensor absolute time by adding the sensor relative time to the zero reset time on the preceding time slot stored by the storage module.

For example, the zero reset period is less than 10 seconds, for example between 50 ms and 1 second, for example between 50 ms and 500 ms, or for example equal to 100 ms.

According to a particular embodiment, the electronic control unit comprises a module for verifying the precision of the relative times of the sensors, configured for determining a relative error of the relative times of the sensors, said verification module being configured for storing each sensor relative time before the zero reset, calculating the difference between two sensor relative times between two successive zero resets, comparing said difference with an absolute time difference of the internal clock of the electronic control unit between two absolute times between two successive zero resets corresponding, respectively, to the two sensor relative times, and for calculating a relative error corresponding to the difference between the difference between two sensor relative times and the absolute time difference.

Thus it is possible to correct the sensor relative time for the detected events, estimate a degree of reliability, or alternatively correct the one-off processing time.

According to a second aspect, the invention relates to a method for date-stamping an event detected in an automotive vehicle, comprising a plurality of sensors each comprising a relative internal clock, and an electronic control unit comprising an absolute internal clock independent of the relative internal clocks and configured for communicating with each of the sensors via a communication network.

The relative time of the clock of the sensor of a given event is called the sensor relative time, and the times of the clock of the electronic control unit are called reference relative times for the relative clock which is subjected to the same mechanism as the sensor clocks, and absolute time for the clock without zero reset. The electronic control unit may be, for example, a driving assistance computer, known to those skilled in the art by the English abbreviation "ADAS". The communication network may be, for example, a network which is well known to those skilled in the art by the English abbreviation "CAN", for "Controller Area Network". By way of variant, any communications network, of the Ethernet, FlexRay, or other type, for example, could be provided.

The absolute clock is considered to be the absolute reference clock. The reference clock time is called the absolute time.

"Event" is taken to mean any signal detected by a sensor such as a camera, a radar apparatus, or any other means capable of detecting an object or a target, or any means capable of transmitting a dated piece of information.

According to the method, all the relative internal clocks of the sensors are reset to zero at each period, via communication frames of the communication network; the absolute zero reset time of the absolute clock of the electronic control unit is stored at each zero reset; an event, that is to say any signal detected by a sensor such as a camera, a radar apparatus, or any other means capable of detecting an object or a target, is detected; at each detected event, a sensor relative time is received, originating from the relative clock of the sensor associated with the detected event; and a sensor absolute time is calculated as a function of the sensor relative time of the internal clock of a sensor associated with the detected event and of the zero reset time stored by a storage module in the electronic control unit at each zero reset, enabling a reference relative time to be defined.

For example, the zero reset period is less than 10 seconds, for example between 50 ms and 1 second, for example between 50 ms and 500 ms, or for example equal to 100 ms.

Thus the zero resetting of all the relative clocks, using periodic communication frames already present in the communication network, makes it possible to avoid any additional network load and to reduce losses of time caused by the preparation of an absolute synchronization frame which subsequently has to be transmitted and then decoded, as is the case in the prior art.

According to the present invention, the reception of a zero reset signal by communication frames simply reinitializes the local counter of each of the relative clocks.

Advantageously, during the calculation of the sensor absolute time, the sensor relative time of the internal clock of a sensor associated with the detected event is compared with the reference relative time of the internal clock of the electronic control unit.

For example, when the sensor relative time is less than the reference relative time, the sensor absolute time is calculated by adding the sensor relative time to the absolute zero reset time stored by the storage module, minus a predetermined processing time.

In particular, when the sensor relative time is greater than the reference relative time, said sensor relative time is compared with the zero reset period, and when the sensor relative time is greater than the zero reset period, the sensor absolute time is calculated by adding the sensor relative time modulo the zero reset period to the absolute zero reset time; and when the sensor relative time is less than the zero reset period, the sensor absolute time is calculated by adding the sensor relative time to the absolute zero reset time in the preceding time slot stored by the storage module.

Also in particular, the precision of the relative times of the sensors is verified, and for this purpose each sensor relative time before the zero reset is stored, the difference between two sensor relative times between two successive zero resets is calculated, said difference is compared with an absolute time difference of the internal clock of the electronic control unit between two absolute times between two successive zero resets corresponding, respectively, to the two sensor relative times, a relative error is calculated, corresponding to the difference between the difference between two sensor relative times and the absolute time difference.

Other objects, characteristics and advantages of the invention will be apparent from the following description, provided solely by way of non-limiting example, with reference to the attached drawings, in which:

FIGS. 2 to 4 show in graph form the time of an event, the zero reset period and the absolute clock time according to the invention;

Figure 1:
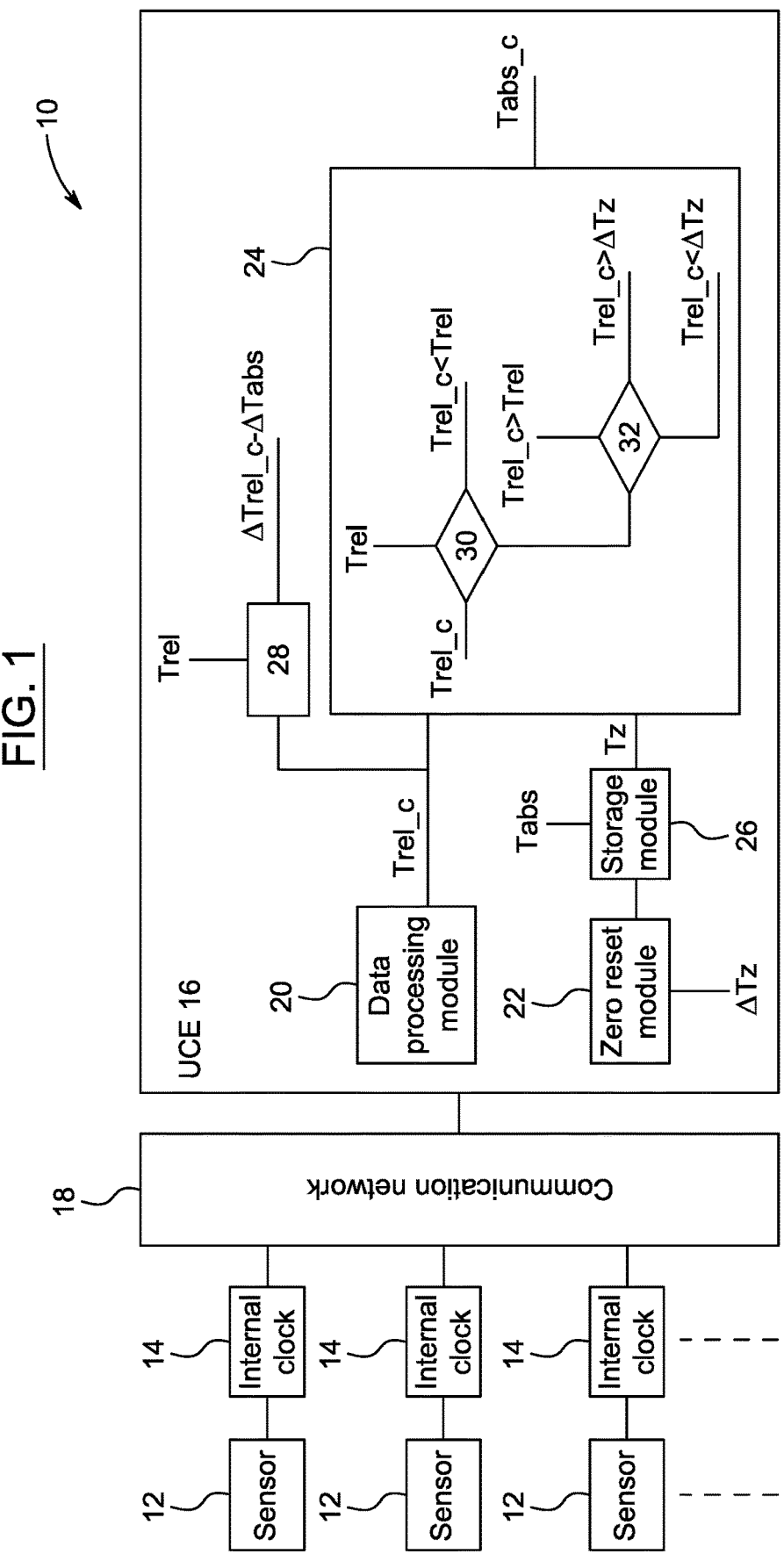
FIG. 1 shows in a highly schematic way a system for date-stamping an event according to the invention in an automotive vehicle.

As shown in FIG. 1, a system 10 for date-stamping an event occurring, notably, in an automotive vehicle enables events to be dated in a reliable and precise manner.

"Event" is taken to mean any signal detected by a sensor such as a camera, a radar apparatus, a lidar apparatus, a sonar apparatus, or any other means capable of detecting an object or a target or of providing any other type of dated information.

The date-stamping system 10 comprises a plurality of sensors 12, each comprising an internal clock 14, called a "relative" clock. The date-stamping system also comprises an electronic control unit ECU 16 configured for communicating with each of the sensors 12 via a communication network 18. The relative time of the clock of the sensor of a given event is called the sensor relative time $Trel\_c$, and the absolute time, reconstructed on the basis of the sensor relative time of a given event and of an absolute time of a clock of the electronic control unit, is called the sensor absolute time $Tabs\_c$.

The electronic control unit 16 may be, for example, a driving assistance computer, known to those skilled in the art by the English abbreviation "ADAS", for "Advanced Driver Assistance System".

The communication network 18 may be, for example, a network which is well known to those skilled in the art by the English abbreviation "CAN", for "Controller Area Network". By way of variant, any communications network, of the Ethernet, FlexRay, or other type, for example, could be provided. More generally, the invention is applicable to any network or sub-network in which an electronic control unit is already sending periodically, with a period ΔTz, a frame for providing one or more predefined electronic equipments connected to the network or to the sub-network with real-time information, such as whether the vehicle doors are open or closed. It is then simply necessary to program, in each sensor to be synchronized which is connected to the network or sub-network, and which may or may not be different from a predefined electronic equipment, a low layer of reading on interruption of a frame header, for detecting the pre-existing periodic frame and considering it as a frame for the zero reset of its relative internal clock.

The electronic control unit 16 comprises an internal clock called the "absolute clock" (not shown) which is independent of the internal clocks 14 of the sensors 12. The absolute clock is considered to be the reference clock. The reference absolute clock time is called the absolute time Tabs.

The electronic control unit 16 comprises a data processing module 20 which receives at its input, at each event detected by a sensor, a relative time Trel_c originating from the relative clock 14 of the sensor 12 associated with the detected event.

The electronic control unit 16 further comprises a zero reset, or "reset" in English, module 22, configured for using an existing communication frame as a zero reset signal for all the relative internal clocks 14, via periodic communication frames (not shown) of the communication network 18. For example, the zero reset period ΔTz is between 50 ms and 200 ms, for example equal to 100 ms. The zero reset period ΔTz may very well be as much as a second or more, if the drift of the relative internal clocks is very small. A criterion for the choice of zero reset period is that of limiting its length to that for which a drift of the internal clock may cause an error greater than the chosen unit. For example, if the times are expressed in milliseconds, the drift at the end of a period must not reach one millisecond. Another criterion for choice is that of determining a period length that is sufficiently great to be longer than the processing time of an event between its capture and transmission over the CAN network, in order to avoid any ambiguity concerning the counting time slot to which the event belongs.

Thus the zero resetting of all the relative clocks, using communication frames already present in the communication network 18, makes it possible to avoid any additional network load and to reduce losses of time caused by the preparation of an absolute synchronization frame which subsequently has to be transmitted and then decoded, as is the case in the prior art.

According to the present invention, the reception of a zero reset signal by a communication frame simply reinitializes the local counter of each of the relative clocks.

The electronic control unit 16 also comprises a module 24 for calculating the sensor absolute time Tabs_c as a function of the relative time Trel_c of the internal clock 14 of a sensor 12 and of the zero reset time Tz stored by a storage module 26 in the electronic control unit 16 at each zero reset. The sensor absolute time Tabs_c is written according to the following equation:

$$Tabs\_c = (Trel\_c + Tz) - Tc \quad \text{(Eq. 1)}$$

where:

Tabs_c is the absolute time associated with a sensor for a given event, expressed in milliseconds for example;

Trel_c is the sensor relative time associated with the internal clock 14 of a sensor for a given/detected event, expressed in milliseconds for example;

Tz is the absolute zero reset time stored by the storage module 26 at each zero reset, expressed in milliseconds for example; and Tc is the calculation and/or processing time required for transmitting the relative time to the calculation module 24, expressed in milliseconds for example. The calculation time Tc is, for example, in the form of a predetermined time to be applied.

As shown in FIG. 1, the electronic control unit 16 comprises a module 28 for verifying the precision of the relative times of the sensors Trel_c in order to estimate a relative error over a measurement time slot. For this purpose, the verification module 28 is configured for receiving, from a sensor, each relative time Trel_c, measured by the sensor and sent to the electronic unit before the zero reset, for the purpose of calculating its difference ΔTrel_c between two relative times Trel_c1 and Trel_c2 of successive zero resets. The verification module 28 is configured for comparing said difference ΔTrel_c with an absolute time difference ΔTabs of the internal clock of the ECU 16 between two absolute times Tabs1 and Tabs2, which correspond to the same zero resets as Trel_c1 and Trel_c2:

$$\Delta Trel\_c = Trel\_c1 - Trel\_c2 \quad \text{(Eq. 2)}$$

$$\Delta Tabs = Tabs1 - Tabs2 \quad \text{(Eq. 3)}$$

By comparing these two differences it is possible to detect any deviation, and to adapt, or not adapt, the received dates for the next receptions (simple homothety).

The above corrections are intended to allow for the following considerations:

The first absolute time Tabs1 corresponds to the absolute time of the ECU's reception of the frame containing the value Trel_c1, and the second absolute time Tabs2 corresponds to the absolute time of the ECU's reception of the frame containing the value Trel_c2.

The ECU is configured for detecting any failed zero reset/return of a sensor and will then disable this calculation, or, advantageously, will take the previous corresponding reset date.

The verification module 28 calculates a relative error E corresponding to the difference between ΔTrel_c and ΔTabs, and may thus correct the sensor relative time Trel_c for the detected events, estimate a degree of reliability, or alternatively correct the one-off processing time Tc.

The sensor absolute time calculation module 24 comprises a module 30 configured for comparing the sensor relative time Trel_c of the internal clock of a sensor associated with a given event with the reference relative time Trel, derived from the absolute time Tabs of the internal clock of the ECU 16.

If the sensor relative time Trel_c of the internal clock of a sensor associated with the detected event is less than the reference relative time Trel of the internal clock of the ECU 16, corresponding to the case shown in FIG. 2, the calculation module 24 calculates the sensor absolute time Tabs_c by adding the sensor relative time Trel_c to the zero reset time Tz stored by a storage module 26 according to Equation 1.

For the case where the sensor relative time Trel_c of the internal clock of a sensor associated with the detected event is greater than the reference relative time Trel of the internal clock of the ECU 16, two cases must be distinguished, corresponding to the case shown in FIGS. 3 and 4, and two cases are to be considered: the calculation module 24 comprises a module 32 configured for comparing the sensor relative time Trel_c of the internal clock of a sensor associated with a given event with the zero reset period ΔTz. If the sensor relative time Trel_c is greater than the zero reset period ΔTz, the calculation module 24 calculates the sensor absolute time Tabs_c by adding the relative time Trel_c modulo ΔTz to the zero reset time Tz stored (for consideration of the preceding period) by a storage module 26 according to the following equation (shown in FIG. 3):

$$Tabs\_c=(Trel\_c \bmod \Delta Tz+Tz)-Tc \quad \text{(Eq. 4)}$$

This operation may be executed with as many unexecuted resets as permitted by the maximum duration of the sensor relative time that can be transmitted via the CAN.

If the sensor relative time Trel_c is much less than the zero reset period ΔTz, corresponding to the case shown in FIG. 4, this means that the change of time slot has taken place during the processing time Tc, and the calculation module 24 calculates the sensor absolute time Tabs_c by adding the relative time Trel_c to the zero reset time Tz−1 for the preceding time slot stored by the storage module 26 according to the following equation:

$$Tabs\_c=(Trel\_c+Tz-1)-Tc \quad \text{(Eq. 5)}$$

It should be noted that the relative time may be greater if the zero reset is not executed (if the frame is not received, for various reasons). In this case, the calculation modulo this zero reset period makes it possible to continue using the device. This remains possible as long as the maximum transmissible date of Trel_c has not been passed.

Figure 5:
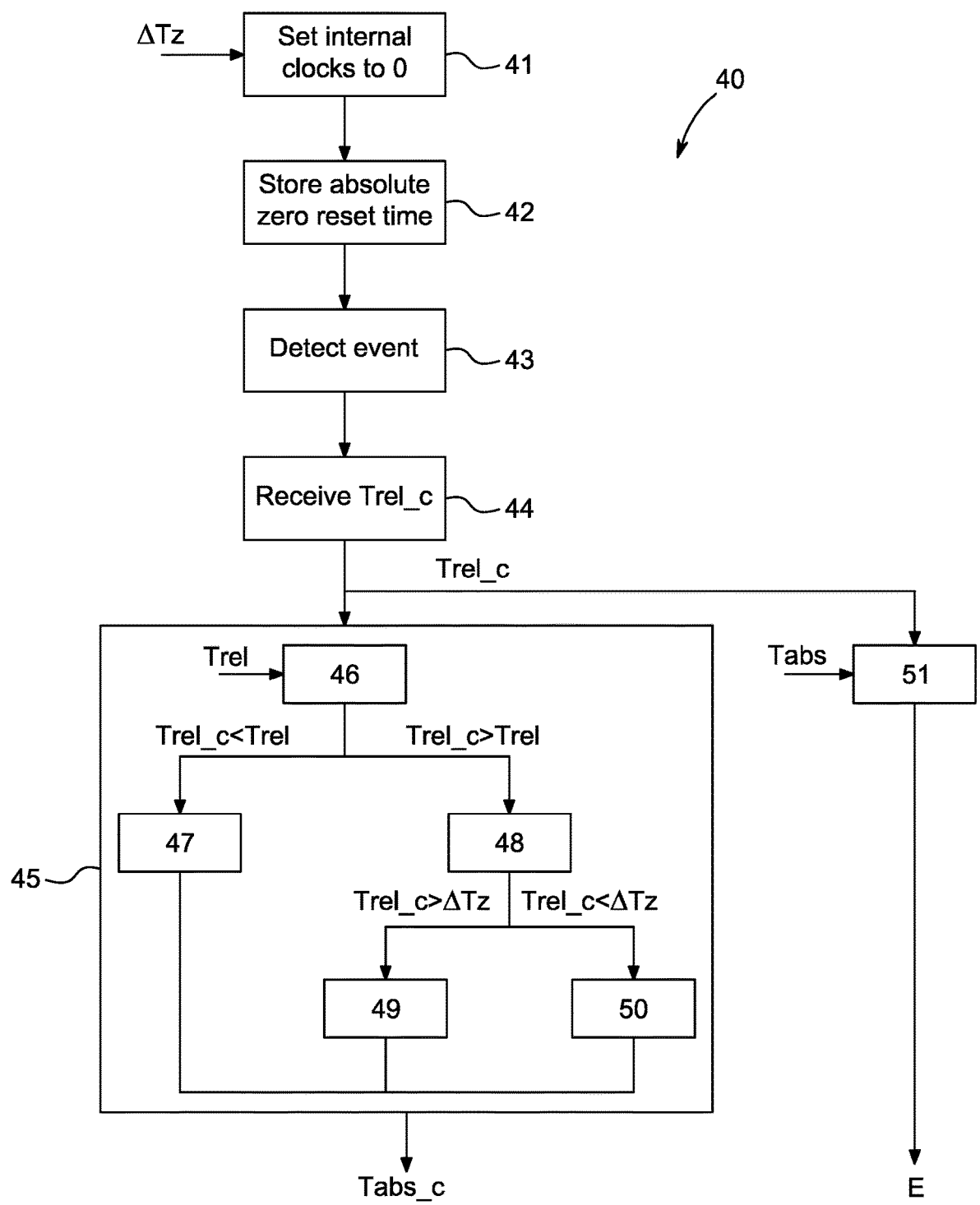
FIG. 5 shows a flow diagram of a method for date-stamping an event in an automotive vehicle according to the invention.

FIG. 5 shows a flow diagram of a method 40 for datestamping an event in an automotive vehicle according to the invention.

In a first step 41, all the relative internal clocks 14 of the sensors 12 are reset to zero at each period ΔTz, via communication frames (not shown) of the communication network 18. For example, the zero reset period ΔTz is less than 10 seconds, for example between 50 ms and 1 second, for example between 50 ms and 500 ms, or for example equal to 100 ms.

Thus the zero resetting of all the relative clocks, using communication frames already present in the communication network 18, makes it possible to avoid any additional network load and to reduce losses of time caused by the preparation of a transmitted absolute synchronization frame which subsequently has to be transmitted and then decoded, as is the case in the prior art.

According to the present invention, the reception of a zero reset signal by communication frames simply reinitializes the local counter of each of the relative clocks.

In a second step 42, the absolute zero reset time Tz of the absolute clock of the electronic control unit 16 is stored at each zero reset.

Then, in step 43, an event is detected, where an event means any signal detected by a sensor such as a camera, a radar apparatus, a lidar apparatus, a sonar apparatus, or any other means capable of detecting an object or a target or of providing any other type of dated information.

In step 44, a relative time Trel_c, originating from the relative clock 14 of the sensor associated with the detected event, is received. The relative time Trel_c is received by the electronic control unit 16 after a processing time Tc.

In step 45, the sensor absolute time Tabs_c is calculated as a function of the relative time Trel_c of the internal clock 14 of a sensor 12 associated with the detected event and of the zero reset time Tz stored by a storage module 26 in the electronic control unit 16 at each zero reset. The sensor absolute time Tabs_c is written according to the following equation:

$$Tabs\_c=(Trel\_c+Tz)-Tc \quad \text{(Eq. 1)}$$

where:

Tabs_c is the absolute time associated with a sensor for a given event, expressed in milliseconds for example;

Trel_c is the relative time associated with the internal clock 14 of a sensor for a given event, expressed in milliseconds for example;

Tz is the absolute zero reset time stored by the storage module 26 at each zero reset, expressed in milliseconds for example; and Tc is the calculation and/or processing time required for transmitting the relative time to the calculation module 24, expressed in milliseconds for example. The calculation time Tc is, for example, in the form of a predetermined time to be applied.

In step 45, in which the sensor absolute time Tabs_c is calculated, the relative time Trel_c of the internal clock of a sensor associated with the detected event is compared, in step 46, with the reference relative time Trel, derived from the absolute time Tabs of the internal clock of the ECU 16.

If the relative time Trel_c of the internal clock of a sensor associated with a given event is less than the reference relative time Trel of the internal clock of the ECU 16, corresponding to the case shown in FIG. 2, then the sensor absolute time Tabs_c is calculated, in step 47, by adding the relative time Trel_c to the zero reset time Tz stored by a storage module 26 according to Equation 1.

If the relative time Trel_c of the internal clock of a sensor associated with a given event is greater than the reference relative time Trel of the internal clock of the ECU 16, corresponding to the case shown in FIG. 3, then the relative time Trel_c of the internal clock of a sensor associated with the detected event is compared, in step 48, with the zero reset period ΔTz.

If the relative time Trel_c is greater than the zero reset period ΔTz, then the sensor absolute time Tabs_c is calculated, in step 49, by adding the relative time Trel_c modulo ΔTz to the zero reset time Tz stored (for consideration of the preceding period) by a storage module 26 according to the following equation:

$$Tabs\_c=(Trel\_c \bmod \Delta Tz+Tz)-Tc \quad \text{(Eq. 4)}$$

If the sensor relative time Trel_c is less than the zero reset period ΔTz, corresponding to the case shown in FIG. 4, this means that the change of time slot has taken place during the processing time Tc, and the sensor absolute time Tabs_c is calculated, in step 50, by adding the relative time Trel_c to the zero reset time Tz−1 for the preceding time slot stored by the storage module 26 according to the following equation:

$$Tabs\_c=(Trel\_c+Tz-1)-Tc \quad \text{(Eq. 5)}$$

As shown in FIG. 5, the method comprises a step 51 of verifying the precision of the relative times of the sensors Trel_c in order to estimate a relative error over a measurement time slot. For this purpose, each sensor relative time Trel_c before the zero reset is stored and the difference ΔTrel_c between two relative times Trel_c1 and Trel_c2 between two successive zero resets is compared, said difference ΔTrel_c is compared with an absolute time difference ΔTabs of the internal clock of the ECU 16 between two absolute times Tabs1 and Tabs2 between two successive zero resets corresponding, respectively, to the two relative times Trel_c1 and Trel_c2:

$$\Delta Trel\_c = Trel\_c1 - Trel\_c2 \qquad \text{(Eq. 2)}$$

$$\Delta Tabs = Tabs1 - Tabs2 \qquad \text{(Eq. 3)}$$

Finally, a relative error E corresponding to the difference between ΔTrel_c and ΔTabs is calculated, making it possible to correct the relative time Trel_c for the received events, to estimate a degree of reliability, or alternatively to correct the one-off processing time Tc.

As a result of the invention, the absolute clock is independent of the clocks of the sensors, enabling the system to establish diagnostics for malfunctions of the clocks of the sensors without being affected by them. Thus the system is fault tolerant.

The absolute clock enables the relative clocks of the sensors to be adjusted via regular zero resets to avoid drift.

Moreover, the invention requires no additional network load, since it uses the network and communications already present in the computers of automotive vehicles.

The invention claimed is:

1. A system for date-stamping an event occurring in an automotive vehicle, comprising:
    a plurality of sensors each comprising a relative internal clock; and
    an electronic control unit comprising an absolute internal clock and configured to communicate with each of the sensors via a communication network, the electronic control unit further comprising:
        a data processing module configured to receive at its input, at each event detected by a sensor, a sensor relative time originating from the relative clock of the sensor associated with the detected event,
        a zero reset module configured to transmit, at each period, a zero reset signal for all the relative internal clocks, via communication frames of the communication network, and
        a calculation module configured to calculate a sensor absolute time as a function of the relative time received by the processing module and of a zero reset time stored by a storage module in the electronic control unit at each zero reset, defining a reference relative time.

2. The system as claimed in claim 1, wherein the module configured to calculate the sensor absolute time comprises a module configured to compare the relative time of the internal clock of a sensor associated with the detected event with the reference relative time of the internal clock of the electronic control unit.

3. The system as claimed in claim 2, wherein, when the sensor relative time is less than the reference relative time, the calculation module is configured to calculate the sensor absolute time by adding the sensor relative time to the zero reset time stored by the storage module, minus a predetermined processing time.

4. The system as claimed in claim 2, wherein, when the sensor relative time is greater than the reference relative time, the calculation module comprises a comparison module configured to compare said sensor relative time with a zero reset period, when the sensor relative time is greater than a zero reset period, the calculation module is configured to calculate the sensor absolute time by adding the sensor relative time to the zero reset time; and when the sensor relative time is less than the zero reset period, the calculation module is configured to calculate the sensor absolute time by adding the sensor relative time to the zero reset time for the preceding time slot stored by the storage module.

5. The system as claimed in claim 4, wherein the zero reset period is between 50 ms and 500 ms.

6. The system as claimed in claim 1, wherein the electronic control unit comprises a module to verify the precision of the relative times of the sensors, configured to determine a relative error of the relative times of the sensors, said verification module being configured to store each sensor relative time before the zero reset, calculate the difference between two sensor relative times between two successive zero resets, compare said difference with an absolute time difference of the internal clock of the electronic control unit between two absolute times between two successive zero resets corresponding, respectively, to the two sensor relative times, and to calculate a relative error corresponding to the difference between the difference between two sensor relative times and the absolute time difference.

7. A method for date-stamping an event detected in an automotive vehicle comprising a plurality of sensors each comprising a relative internal clock, and an electronic control unit comprising an absolute internal clock and configured for communicating with each of the sensors via a communication network, the method comprising:
    resetting all the relative internal clocks of the sensors to zero at each period, via communication frames of the communication network;
    storing an absolute zero reset time of the absolute clock of the electronic control unit at each zero reset;
    detecting an event;
    receiving, when each event is detected, a sensor relative time originating from the relative clock of the sensor associated with the detected event; and
    calculating a sensor absolute time as a function of the sensor relative time of the internal clock of a sensor associated with the detected event and of the zero reset time stored by a storage module in the electronic control unit at each zero reset, defining a reference relative time.

8. The method as claimed in claim 7, wherein, during the calculation of the sensor absolute time, the sensor relative time of the internal clock of a sensor associated with the detected event is compared with the reference relative time of the internal clock of the electronic control unit.

9. The method as claimed in claim 8, wherein, when the sensor relative time is less than the reference relative time, the sensor absolute time is calculated by adding the sensor relative time to the zero reset time stored by the storage module, minus a predetermined processing time.

10. The method as claimed in claim 8, wherein, when the sensor relative time is greater than the reference relative time, said sensor relative time is compared with a zero reset period; when the sensor relative time is greater than the zero reset period, the sensor absolute time is calculated by adding the sensor relative time to the zero reset time; and when the sensor relative time is less than the zero reset period, the sensor absolute time is calculated by adding the sensor relative time to the zero reset time for the preceding time slot stored by the storage module.

11. The method as claimed in claim 7, wherein, in order to verify the precision of the relative times of the sensors, each sensor relative time is stored before the zero reset, the difference between two sensor relative times between two successive zero resets is calculated, said difference is compared with an absolute time difference of the internal clock of the electronic control unit between two absolute times between two successive zero resets corresponding, respectively, to the two sensor relative times, and a relative error is calculated, corresponding to the difference between the difference between two sensor relative times and the absolute time difference.

* * * * *